O. A. HOLLIS.
AUTOMOBILE TRACTOR VEHICLE.
APPLICATION FILED DEC. 14, 1912.

1,229,082.

Patented June 5, 1917.
6 SHEETS—SHEET 2.

O. A. HOLLIS.
AUTOMOBILE TRACTOR VEHICLE.
APPLICATION FILED DEC. 14, 1912.

1,229,082.

Patented June 5, 1917.
6 SHEETS—SHEET 4.

UNITED STATES PATENT OFFICE.

OTIS A. HOLLIS, OF PITTSBURGH, PENNSYLVANIA, ASSIGNOR, BY MESNE ASSIGNMENTS, TO HOLLIS AUTOMATIC TRACTION JACK COMPANY, OF PITTSBURGH, PENNSYLVANIA, A CORPORATION OF DELAWARE.

AUTOMOBILE TRACTOR-VEHICLE.

1,229,082.   Specification of Letters Patent.   Patented June 5, 1917.

Application filed December 14, 1912. Serial No. 736,807.

*To all whom it may concern:*

Be it known that I, OTIS A. HOLLIS, a citizen of the United States, residing at Pittsburgh, in the State of Pennsylvania, have invented certain new and useful Improvements in Automobile Tractor-Vehicles, of which the following is a specification.

My invention relates to self moving vehicles and particularly to such vehicles adapted for the double purpose of acting as tractors for other loads or as vehicles in themselves. The primary objects of the invention are to so design the driving mechanism, the frame and the steering devices of such a machine as to adapt it for ready conversion either into an efficient tractor or a truck at will, the attaining of which object involves certain new ideas in the arrangement of driving mechanism by which the driving mechanism is in part the steering mechanism and is adapted to turn the vehicle in place with positive and direct drive. In other words, my primary design is to give an automobile tractor-truck a greater efficiency and economy than heretofore attained, in part by eliminating the difficulty of requiring a motion of translation in order to attain a motion of turning around, and in part by avoiding waste of energy in applying the driving force in a line outside the line of movement of the weight, etc. I have illustrated the invention in one preferred form, with various other improvements, in the accompanying drawings wherein—

Fig. 2 shows the machine converted into a short base tractor by supplying a pair of additional idle wheels. Figs. 1ª and 3 are detailed side elevations showing a mode of attaching such additional wheels. Fig. 4ª is a detail of the driving wheel clutch. Fig. 5 is a plan view of the machine in the condition of Fig. 1 with the floor and seat and other parts removed.

Figure 1:
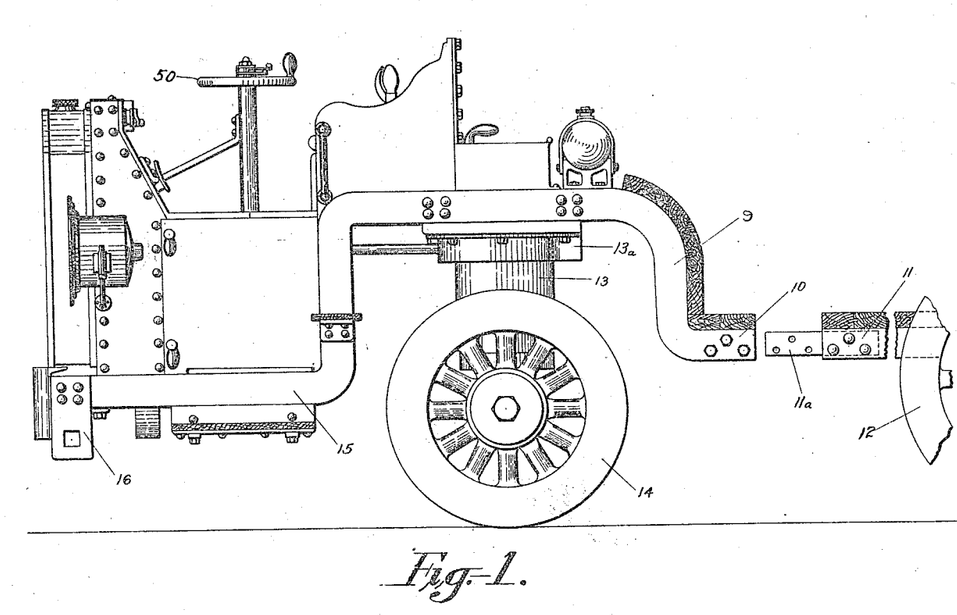
Figure 1 is a side elevation of the machine showing a mode of separation of the tractor and the rear truck platform.

So far as I am aware there has not been heretofore any truck or load carrying vehicle which is easily convertible into an efficient tractor; this because trucks are provided with a long base and a long base is fatal to a properly acting tractor for such work as drawing farm implements, for example. Neither has there been heretofore any truck or traction automobile which was capable of turning around in place without waste of power by reason of the application of the frictional driving force in a line tangential to the line of movement of the whole vehicle rather than directly in the line of movement. For instance, no prior vehicle could literally turn around in place; and even on making a short turn a large part of the thrust was wasted by the tendency to slide the steering wheels laterally to their plane of revolution. I overcome both these difficulties, and secure other advantages, by using not one but two elements corresponding to what is commonly called the "fifth wheel" and in driving by means of vertically resilient mounting of wheels, which can turn completely on a fixed vertical axis of the vehicle. By this expedient also, I attain a four-point supporting base for the load, with the virtual three-point suspension gained by the use of the so-called "fifth wheel". In other words the virtual supporting point of one end of the machine is the mean or center point on a line between the two actual weight-carrying supports of the machine, while these weight-carrying supports are free to independently move vertically and accommodate themselves to the contour of the ground. Preferably, I provide a drop frame as shown in Fig. 1 with a working recess or offset in the frame which need not be wider than one-half the natural wheel base. There are also certain advantages in driving a traction truck by the front wheels, especially when such wheels are capable of turning in any position without moving the frame of the truck.

In the figures, I show a steel drop frame 9 having a rearward platform extension 10 adapted to couple to a platform 11 as by coupling bar 11ª, and carrying idle wheels 12, and adapted to as low a base as the need may warrant. The central portion carries the columns 13 with the driving wheels 14, and the frame has a forward drop 15 upon which I mount the engine and steering mechanism, etc., and at the extreme end of which I provide a boxing 16 for the arbor axles 17ª of an extra pair of idle wheels 17 as shown in Figs. 2 and 3.

Figures 1A, 2, 3:
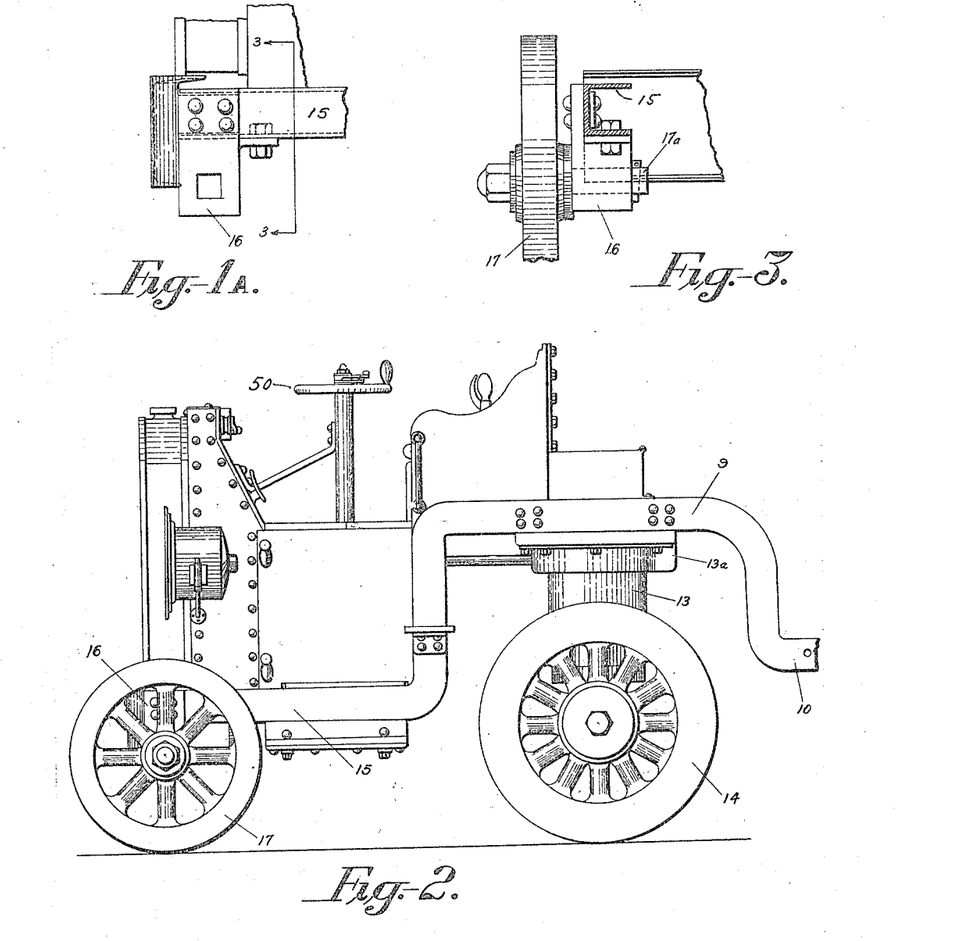

With the machine arranged as in Fig. 1 and connected by the connecting bar 11ª, I have a motor truck, a full width low frame, a long hauling base driven by front wheels which by reason of the forward overhang 15 supports practically all the weight of the machine itself on the driving wheels 14; whereas, as arranged in Fig. 2, I may have a tractor of very short base, but full width and low center of gravity with the capability of making a complete turn in place and of being used as a tractor running in any direction.

Figure 4:
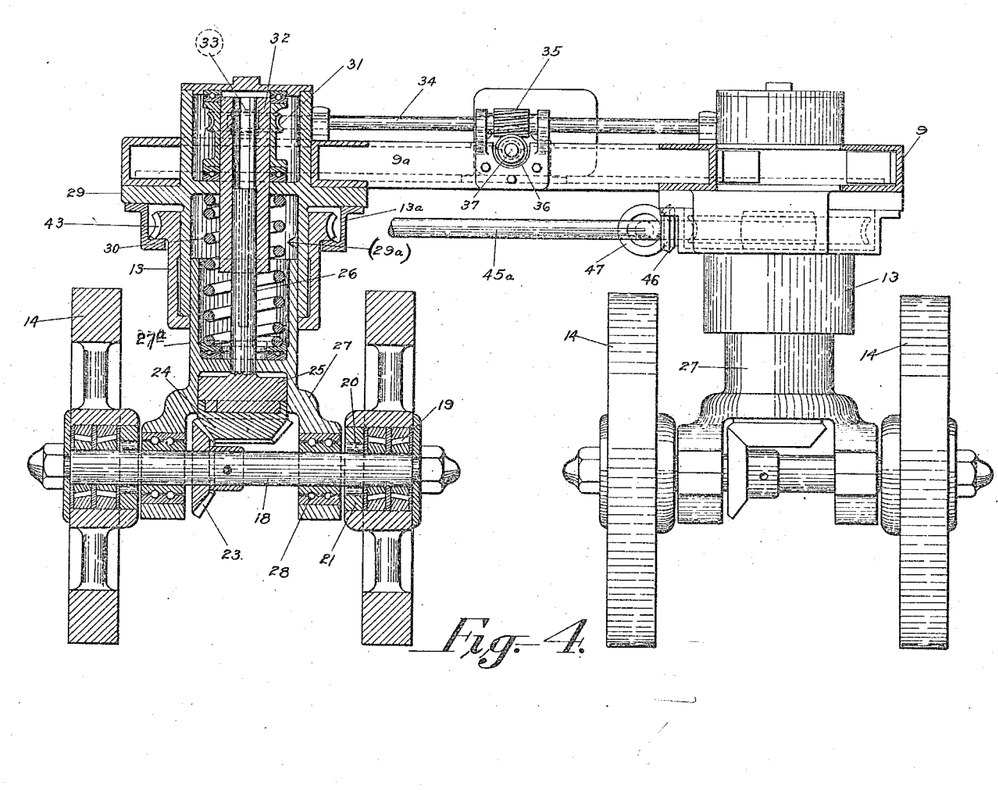
Fig. 4 is a partial vertical section through the frame of the machine in the rear of the driving wheels and on the left a central vertical section through the driving and steering mechanism of the wheels, the section line being taken along the line (4) (4), in Fig. 5.
Figures 4A, 5:
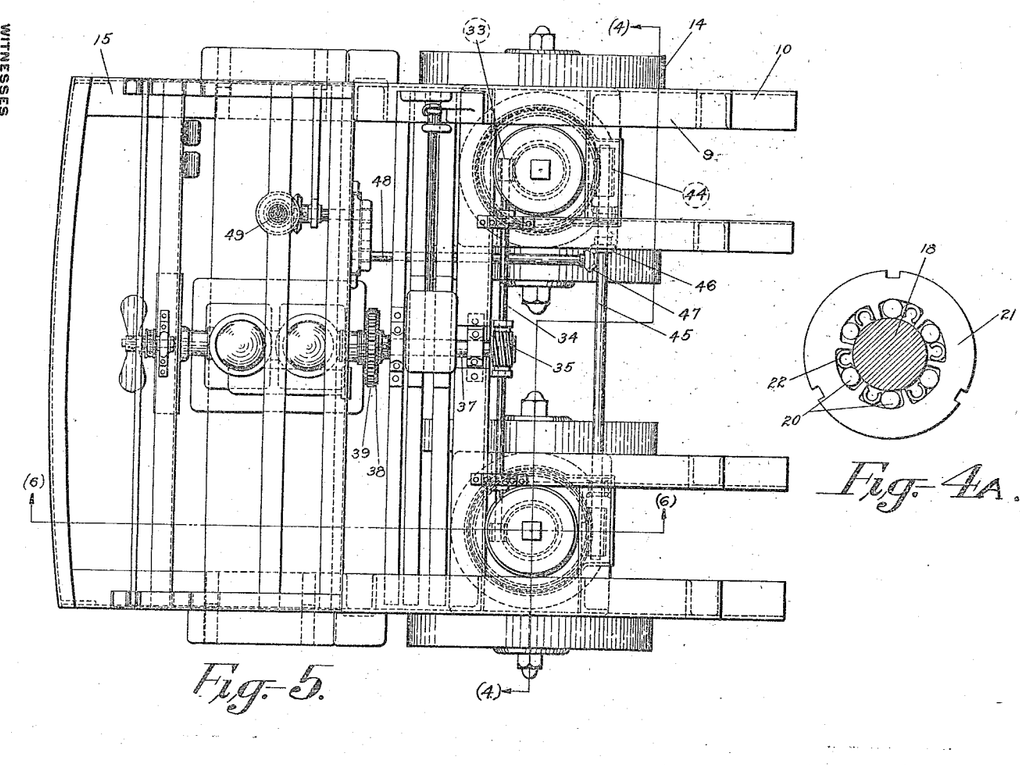
Figure 6:
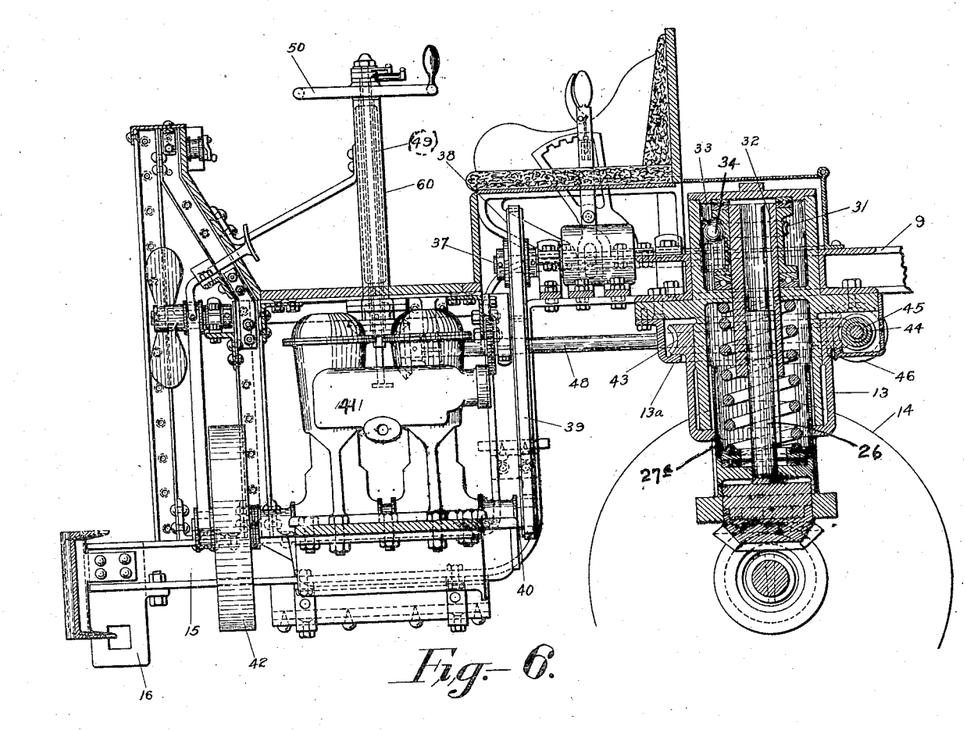
Fig. 6 is a longitudinal vertical section taken along the line (6) (6) in Fig. 5.

Referring now more particularly to Figs. 4 and 6, the driving wheels 14 are in pairs, at a distance apart less than half the width of the wheel base, both pairs being alike in mounting and operation. The wheels 14 are mounted on an axle 18 by means of roller bearings 19 and additional rollers 20 so arranged in a boxing 21 (as shown in Fig. 4ª), as to form an automatic clutch allowing the relative movement of the axle 18 and the wheel boxing 21 freely in one direction while preventing relative movement in the other direction. It will be understood that the bearing slots of the rollers 20 are somewhat inclined so as to grip the roller on the axle 18 and the rollers are held in proper place by springs 22. By this means any one of the wheels 14 may become an idle wheel while its mate is driving in a forward direction giving a positive drive in one of each pair of wheels in making the turn.

The axle 18 has pinned on it a bevel gear 23 meshing with a bevel gear 24 removably set on a squared head 25 of a vertical shaft 26, which head and shaft are carried in the axle housing 27 carrying the ball bearings 28 for support of the vehicle. The upward extending hollow shank 27ª of the housing 27 rides freely in a column housing 29, with which it forms an air dashpot and within which I also provide a coil spring 30. The housing 29 is fixed to the frame 9ª of the machine, and at its upper end has a boxing for a worm gear 31 arranged on ballbearings therein and attached to a vertical sleeve 32 within which the shaft 26 of the gear head 25 is splined, so that the shaft 26 revolves with the sleeve 32 but has free vertical motion in respect thereto under influence of spring 30. Thus the weight of the vehicle is supported on the axle housing 27 of the wheels 14 by the spring 30 and cushioned in all movements by the air in the dashpot (29ª).

In order to apply the normal driving power to the driving wheels 14, the gear 31 of the sleeve 32 is engaged by a worm 33 (more clearly shown in Figs. 5 and 6), mounted on shaft 34, which in turn is provided with a helical gear 35, driven by worm 36 on a shaft 37 which, as more clearly shown in Figs. 5 and 6, is driven through a spur wheel 38 and chain 39, from a sprocket on the shaft 40 of the engine 41. 42 is a flywheel on the same shaft. The form and mounting of the engine is immaterial to my invention.

Figure 7:
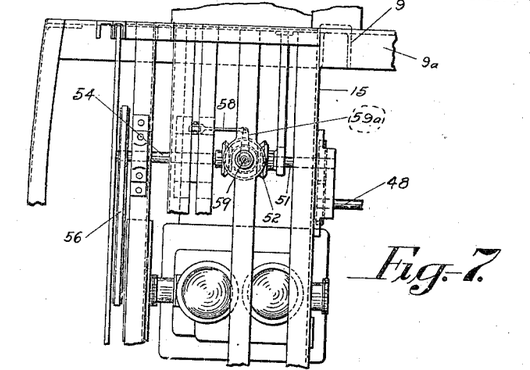
Figs. 7 and 8 are respectively an additional plan and an additional vertical section for illustrating the power steering mechanism hereafter described.

The steering of the vehicle is accomplished by the drive wheels themselves, and is either a hand or power steering, as desired. Thus, again referring to Figs. 4 and 5, I mount in a boxing 13ª and on the column 29, a hollow column 13 which carries a worm gear 43 meshing with a worm 44 (Fig. 6) on the shaft 45, which shaft, by means of bevel gears 46 and 47 (Fig. 5) is turned by shaft 48 in any convenient manner. The shaft 48 is shown in Figs. 5 and 6 as geared up to the vertical steering shaft 49 turned by the handwheel 50; but I prefer to use a power steering device, and this is one of the important features of my invention. It is more clearly shown in Figs. 7 and 8.

The shaft 51, which by bevel gearing 52 is directly attached and operated by the handwheel 50, may be also power operated by bevel gear 53, on shaft 54, driven by a spur wheel 55 and chain 56 from a sprocket 57 on the main shaft 40 of the motor. The gear 53 is thrown into engagement, either forward, neutral or reverse, with the gearing 52, by means of a lever and link mechanism 58 operated by a small arm 59ª on the bottom of central shaft 59 in the steering column 60 supporting the handwheel 50; the shaft 59 being turned by a small handle 61 or in any other convenient manner. That is, a simple movement of the handle 61 will apply power to the steering shaft 51 so as to rotate it in either direction, according to the engagement of the clutch 58ª, which may be of any ordinary construction.

Figure 8:
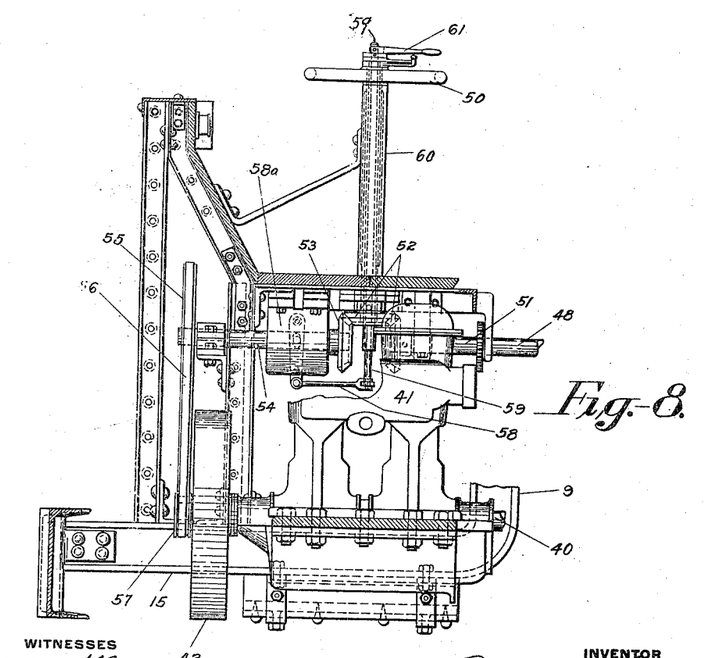

It will be understood that in using the machine as a tractor as in Fig. 1, the steering is accomplished by the drive-wheels 14, whether the machine be run in one direction or the other. In such case it will require considerable power to turn the pairs of drive wheels, and it will be understood that the arrangement of the lever 61 in Fig. 8 is such that it should turn in the same direction as the turning of the handwheel 50 in order to steer in a particular direction. I regard the feature of simultaneously applying power to the drive-wheels by means of the gears 31 and 43, (Fig. 4) as a very important feature and it may be remarked that this would be practically impossible with a single drive-wheel in place of my pair of drive-wheels on a common vertical axis. I prefer to use at 58ª in Fig. 8 a clutch which will admit of differential application of power as well as of reversal, but this clutch may be of any common or approved form.

The peculiar combination of an axle having wheels rotatably mounted thereon with one way clutches, and the reversibility of the mechanism which revolves said axle, has another very important function, to wit, the shifting of the virtual axis of rotation for steering. That is to say, when the axle 18 is turning forward, one or the other of the drive wheels must engage it and in turn engage the earth and become the moving virtual axis of rotation by which the other wheel moves, running idly on the axle. That is the axis of the turning of the steering wheels, when the vehicle is moving, is the tread of the wheel on the inside radius. On the other hand, a stationary turning of the steering wheel about the virtual axis in the tread of the wheel is very undesirable on account of friction and otherwise, and by the provision of reversing the gearing I am able to shift the virtual axis of turning to the neutral point, that is the center of the column 27, between the two wheels. When the axle 18 is revolving backward, or free to revolve backward, of course neither wheel is gripped upon it and both wheels are idle, so that it becomes easy to shift the position of the drive wheels in a stationary condition.

Referring again to Figs. 4, 5 and 6, it will be noted that by splining the tubular shank of head 27 in column 13 and the shaft 26 in the inner sleeve 32, the assembly and removal of the parts is simple and easy and the power for rotating wheels 14 on their axles and also for revolving them about a vertical center, is correctly applied at the same point in the frame so that the thrust for both purposes is taken up by the horizontal beam 9ª directly, while the thrust on the two gears 35 and 46 is also in line with the beams of the frame. I regard these features as important since I thus avoid diagonal stress in all the actions.

It will be observed that by the above described mechanism I accomplish two important and fundamental improvements in such vehicles. By applying the weight as I do, I am enabled to use the steering wheels as drivers, and by dividing the steering base, using two pairs of driving wheels instead of one, this change is rendered possible. Steering by any other than the driving wheels is disadvantageous for two important reasons. First, the thrust of the drive-wheels, when making a turn, is at an angle with the direction of progress of the steering wheel, and secondly the turning moment is not applied about a point of friction on the ground, but is applied about an axis located outside the tread of the wheel and between two wheels, so that I accomplish a rolling turn instead of a frictional turn. Along with these advantages, I have the advantage of literally turning in place without any friction. When the vehicle gets in a rut for example, it is not limited as to the direction in which it may be propelled in order to get out, and the whole power may be applied in any direction, and without any sliding friction. This renders the machine as arranged in Fig. 2 especially efficient for dragging farm implements such as plows, etc., and in the truck as arranged in Fig. 1 it permits of the machine's turning in any place not less than its length, and with full power. My construction also improves the machine's ability as a hill climber, because the application of the tractive power is always tangential to that surface upon which the driving wheel at the moment rests, which is not the case with a rear wheel driven vehicle. It will be seen moreover that in any position of the vehicle, it may be, without moving the body at all, driven by direct force of the engine in any direction desired. That is, the act of "backing up" may be accomplished by literal forward movement of the engine and drive wheels instead of reversing as is usual in such cases. The ability to reverse by reversing the position of the drive wheels instead of reversing the movement of the speed gears, I find to be a great advantage.

It is to be noted also that by the use of four drive wheels instead of two I eliminate bending strains in the frame of the vehicle by applying the pull of the driving wheels at points equally distant on two sides of the point of application of the force to the frame. By this means bending strains on the axle and frame are practically avoided and at the same time the lever arm for application of the power in going around a curve is shortened by half, thus rendering the power more efficient, for example the point of application of the power to the periphery of the worm wheel 43 is of very small distance from the fulcrum point on the ground at the base of the inside driving wheel, whereas with a vehicle having two driving wheels this lever arm must be at least half the width of the total wheel base.

As above pointed out, in the act of steering the vehicle while in motion, the fulcrum point of the steering turn is in the tread of the inside wheel. It will be noted that for this reason the application of the steering power in revolving the column 27, causing the outside wheel to move faster than the inside wheel causes the outside wheel to run idly on the axle and the application of all the power to the wheel which is on the inside of the turn. That is to say, the application of the power for turning is accomplished on the inside of the circumference of turning and is the combined power of the normal driving and of the steering devices. As no power is employed otherwise than for driving the wheel straight forward in the direction of pull, it will be seen that this accomplishes a great improvement over the ordinary automobile vehicle, which applies the power on the outside wheel and requires more power for going around a curve than for going in a straight line, because the thrust of the driving wheel is not in the direction of movement of the vehicle at any one instant, but is in a direction tangential to the curve of the turn.

I believe I am the first to provide a vehicle requiring no more power in making a moving turn than in a straight forward movement, and moreover the first to provide for turning the vehicle and the steering mechanism either in motion or when stationary without any sliding friction or any application of power in any other than the direction of progression. Again, it will be observed that after a turn is made there is a tendency of the driving wheel and of the entire vehicle to automatically resume a position for straight forward progression. I have already pointed out that the vehicle disclosed is capable of being turned around without any forward progression whatever, and I point out that this is a condition not attained by any previously known vehicle.

Having thus described my invention and illustrated its use, what I claim is the following:—

1. A self-propelling combined tractor and truck comprising a frame adapted for attachment of idle wheels at either end thereof, and having at intermediate positions a plurality of pairs of universally revoluble driving wheels, combined with an engine and gearing connected to said wheels and adapted to both drive and steer thereby.

2. A self-propelling combined tractor and motor truck comprising a frame having an upward recess therein and a detachable portion at one end carrying idle wheels, means to attach and detach idle wheels at the other end of the frame, and a plurality of pairs of driving wheels located in the recess of the frame and adapted to turn therein with a radius less than half the width of the machine, an engine and means to drive said wheels.

3. A self-propelling vehicle comprising a frame, one pair of idle wheels, two pairs of driving and steering wheels, the axle of each pair of driving wheels being less than the entire wheel base and means for positively driving said driving wheels in any position around a vertical axis, whereby the machine may be turned in place by the application of power in the direction of movement of the wheel required for steering.

4. A motor vehicle provided with two pairs of front driving wheels mounted with one-way clutches on axles universally revoluble on vertical axes outside the tread of the wheel, and means to positively drive said axles of said pairs of wheels, and thereby one only of said wheels.

5. A motor vehicle having idle rear wheels and two pairs of front driving wheels, each pair of driving wheels being mounted with one-way clutches on axles adapted to turn 360 degrees on a vertical axis, and means to positively drive the axle and one wheel only of each pair in any position, substantially as described.

6. A motor vehicle provided with combined driving and steering wheels, said wheels being mounted in pairs on axles in turn mounted for universal radius of position, and the wheels engaging the same by one-way automatic clutches, whereby the vehicle is adapted to be completely turned around in place and driven in any direction by direct thrust on the driving wheel in the line of movement.

7. In a motor vehicle, the combination with an engine and frame of a combined steering and driving mechanism comprising a short horizontal axle carrying two driving wheels mounted on a completely revoluble vertical column, means for allowing resilient collapse of the vertical column, power operated means to revolve the vertical column and power gearing to rotate said wheel axle, said wheels being attached to said axle by a self-releasing clutch, substantially as described.

8. In a motor vehicle, driving means comprising several pairs of wheels supported on horizontal axles and said axles mounted for complete revolution on a vertical axis, the drive wheels being provided with means to grip the axle upon relative movement in one direction and to release in the other direction, a single motor and gearing to constantly drive both said horizontal axles, and gearing to revolve the pair of wheels about said vertical axle.

9. A motor vehicle having several pairs of driving wheels on axles resiliently mounted under the frame of the vehicle on fixed vertical axes, means to adjust each pair of wheels in any position on the vertical axis and a motor and gearing adapted to positively drive said wheels in any position.

10. In a motor vehicle, the combination with the frame and the motor, a drive wheel mounted on a horizontal axle, a revoluble vertical column supporting said horizontal axle, and supporting the vehicle frame through a collapsible spring, a relatively movable sleeve splined on said column and provided with a gear and worm gearing engaging said sleeve and adapted to thereby rotate the column without interference with the drive wheels.

11. The combination of a drop frame having a forward extension, a motor on said extension, fixed idle wheels on the rear or front of the frame and a double set of universally movable drive wheels supporting the front of the frame at two points, with independent vertical action and gearing to drive said wheels and to revolve each pair on its vertical axis.

12. In a motor vehicle, the combination with a frame, an engine, and two pairs of drive wheels, of a shaft geared simultaneously to both said pairs of wheels through a worm gear and a splined collapsible vertical column, substantially as described.

13. In a motor driven truck, the combination with a frame and an engine, a longitudinally arranged power shaft, of a transverse shaft driven by worm gearing from the power shaft, a tubular vertical shaft driven by worm gearing from said transverse shaft, a housing surrounding said vertical tubular shaft, a hollow vertical column in said housing and forming a dashpot therewith, a gear wheel in said column having a vertical stem telescoping said hollow vertical driving shaft and splined therein, and a pair of driving wheels on said column driven by said latter gear.

14. In a motor vehicle, a mounting for a pair of power driving wheels, comprising an axle boxing carrying a vertical gearing shaft and having a hollow tubular shank, a housing telescoping the said tubular shank to form a dashpot, a tubular vertical driving shaft mounted in said housing and telescoping and splined on said vertical stem of the wheel driving gear, a supplemental tubular vertical column splined upon the axle boxing extension and also mounted in said frame housing, and gearing for turning said latter column and independently turning the said inner hollow driving shaft.

15. In driving means for automobile vehicles, the combination with a rigid frame and a fixed vertical housing 29, of a hollow vertical driving shaft 32 and a hollow vertical column mounted in said housing, a gear wheel in said column having a driving stem splined into the tubular shaft 32, a tubular column 13 revolubly mounted on the outside of said housing and splined upon the tubular gearing column and provided with the worm gear, substantially as described.

16. In driving mechanism for motor vehicles, the combination with the frame and a fixed hollow boxing of an axle carrying a tubular column loosely mounted in said boxing and carrying a gear wheel shaft, a hollow vertical driving shaft also mounted in the boxing and splined on said wheel gear shaft, a second vertical hollow column 13 riding loosely on the boxing but splined to the wheel supporting column, an axle and drive wheels on said wheel supporting column, and gearing for applying power to independently rotate the said column 13 and the hollow vertical driving shaft 32.

17. An automobile driving mechanism comprising a collapsible telescoping vertical column forming a dashpot and containing a coil spring, gearing for the drive wheels inside said column and power operated means to revolve the column.

18. A vehicle comprising a motor, a pair of combined steering and driving wheels mounted on an axle driven by said motor and having one way automatic clutches engaging the axle and means to rotate the axle backward and thus release both clutches in order to neutralize said axle and permit turning without gripping either wheel.

19. In a motor vehicle, the combination with a frame and motor and a pair of driving wheels mounted on an axle supported to swing on a vertical pivot, and a pair of wheels mounted on said axle with clutches engaging the axle in one direction only, the motor gearing having devices to reversely rotate said axle and independent power driven means to turn the wheel axle support, substantially as described.

20. A tractor for farm vehicles, comprising a frame having an upward recess and a depressed platform on the end of the frame opposite to that intended to be attached to the load, a pair of collapsible and rotatable vertical columns in the recess of the frame, each column supplied with a short horizontal axle, idle wheels with automatic one-way clutches on the ends of said axle, and gearing inclosed within the vertical column and connected to said engine adapted to rotate the column and to revolve the horizontal wheel axle, substantially as described.

In testimony whereof I have hereunto signed my name in the presence of the two subscribed witnesses.

OTIS A. HOLLIS.

Witnesses:
FRED'K STAUB,
JO. BAILY BROWN.